United States Patent
Ojima et al.

(10) Patent No.: US 7,851,099 B2
(45) Date of Patent: Dec. 14, 2010

(54) FUEL CELL SYSTEM AND CONTROL METHOD FOR FUEL CELL

(75) Inventors: Kuniaki Ojima, Yuki (JP); Yoshikazu Murakami, Utsunomiya (JP); Shinji Yoshikawa, Utsunomiya (JP); Junji Uehara, Utsunomiya (JP); Kenichiro Ueda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 830 days.

(21) Appl. No.: 11/019,723

(22) Filed: Nov. 19, 2004

(65) Prior Publication Data

US 2005/0118467 A1 Jun. 2, 2005

(30) Foreign Application Priority Data

Nov. 28, 2003 (JP) .............................. 2003-398917

(51) Int. Cl.
*H01M 8/04* (2006.01)

(52) U.S. Cl. ......................... 429/444; 429/442; 429/446

(58) Field of Classification Search ........................ None
See application file for complete search history.

(56) References Cited

U.S. PATENT DOCUMENTS

2003/0012991 A1*  1/2003  Muehlherr et al. ............. 429/25

FOREIGN PATENT DOCUMENTS

| CA | 2 239 585 | 11/2001 |
| CA | 2 339 585 | 11/2001 |
| JP | 6-243886 A | 9/1994 |
| JP | 8-45525 | 2/1996 |
| JP | 10-125341 A | 5/1998 |
| JP | 2000-48838 | 2/2000 |
| JP | 2001-345112 A | 12/2001 |
| JP | 2002-352826 A | 12/2002 |

OTHER PUBLICATIONS

Machine translation of JP 2002-352826, Dec. 2002.*
"Notice of Reasons for Rejection" issued May 7, 2008 by the Japanese Patent Office in application JP 2003-398917.
Notice of Reasons for Rejection issued Jun. 16, 2009 by the Japanese Patent Office in related application No. JP 2003-398917.
Notice of Allowance issued Aug. 25, 2009 by the Japanese Patent Office in related application No. JP 2003-398917.

* cited by examiner

*Primary Examiner*—Jonathan Crepeau
(74) *Attorney, Agent, or Firm*—Hamre, Schumann, Mueller & Larson, P.C.

(57) ABSTRACT

A fuel cell system includes: a fuel cell which generates electricity by supplying hydrogen to an anode electrode, and a reaction gas to a cathode electrode, an anode gas supply device which supplies hydrogen to the anode electrode, and a cathode gas supply device which drives a compressor using electric power generated by the fuel cell, and supplies pressurized reaction gas to the cathode electrode. The fuel cell system further includes a target pressure setting device which sets a target value for cathode pressure of the fuel cell, a correction device which corrects the target value in accordance with atmospheric pressure, and a control device which controls the cathode pressure of the fuel cell to the corrected target value. Efficient electric power generation can be performed in accordance with the ambient environment.

2 Claims, 8 Drawing Sheets

FUEL CELL SYSTEM AND CONTROL METHOD FOR FUEL CELL

BACKGROUND OF THE INVENTION

1. Field of the Invention

Priority is claimed on Japanese Patent Application No. 2003-398917, filed Nov. 28, 2003, the contents of which are incorporated herein by reference.

The present invention relates to a fuel cell system having an anode gas supply device which supplies hydrogen to an anode electrode, and a cathode gas supply device which drives a compressor using electric power generated by the fuel cell, and supplies pressurized reaction gas to the cathode electrode. The present invention also relates to a control method for a fuel cell.

2. Description of Related Art

Recently, the development of fuel cell vehicles using electricity generated by a fuel cell is proceeding.

As this type of fuel cell vehicle, there is one where an anode gas supply device which supplies hydrogen to an anode electrode, and a compressor which supplies reaction gas to a cathode electrode are mounted within a vehicle, and hydrogen is supplied to the anode electrode and reaction gas to the cathode electrode to generate electricity. In practice, since electric power is required to drive the compressor, a part of the electric power generated by the fuel cell is consumed by the compressor. Moreover, since the electric power consumption of the compressor increases accompanying an increase in the electric power generated, it is not always efficient to increase the electric power generated to an unlimited extent. From this point of view, in Japanese Patent Application Unexamined Publication No. 8-45525, a technique is proposed to set the cathode pressure in accordance with the target generated current, so that the electric power generation efficiency of the fuel cell (overall efficiency in consideration of electric power consumption of the compressor) becomes a maximum.

However, the power generation efficiency of the fuel cell is insufficient if only the target generated current is considered, and it varies in accordance with environmental factors such as ambient temperature and pressure and the like. Therefore, there is the problem that in control with the aforementioned conventional technology, generation of electric power at sufficient efficiency is not possible in some cases.

SUMMARY OF THE INVENTION

It is an object of the present invention to provide a fuel cell system whereby electric power can be generated efficiently in accordance with the ambient environment. It is another object of the present invention to provide a control method for a fuel cell whereby electric power can be generated efficiently in accordance with the ambient environment.

In order to attain the above object, according to an aspect of the present invention, there is provided a fuel cell system including: a fuel cell having an anode electrode and a cathode electrode, the fuel cell generating electricity by supplying hydrogen to the anode electrode, and a reaction gas to the cathode electrode; an anode gas supply device which supplies hydrogen to the anode electrode; and a cathode gas supply device which drives a compressor using electric power generated by the fuel cell, and supplies the reaction gas pressurized to the cathode electrode, comprising: a target pressure setting device (for example, step S04 in the embodiment) which sets a target value for cathode pressure of the fuel cell; a correction device (for example, step S06 in the embodiment) which corrects the target value in accordance with atmospheric pressure; and a control device (for example, step S12 in the embodiment) which controls the cathode pressure of the fuel cell to the corrected target value.

According to the thus constructed fuel cell system, since the target value can be corrected in accordance with atmospheric pressure being a cause of variation in the electric power consumption of the compressor, then even when the atmospheric pressure varies, the electric power consumption of the compressor can be suppressed, and a decrease in external output can be prevented.

Preferably, in the fuel cell system as mentioned above, the correction device decreases the target value when a detected atmospheric pressure decreases.

According to the thus constructed fuel cell system, since the target value is decreased when the atmospheric pressure decreases, then a drive power equivalent to when the atmospheric pressure does not tend to decrease is required of the compressor, and an increase in the electric power consumption of the compressor can be prevented, and a decrease in external output can be prevented.

Preferably, the fuel cell system as mentioned above further comprises a back pressure valve located downstream of the cathode electrode, whose opening is feedback-controlled by the control device such that the cathode pressure of the fuel cell matches the corrected target value for the cathode pressure.

Preferably, the fuel cell system as mentioned above further comprises a regulator located between the anode gas supply device and the anode electrode, the regulator being operated in accordance with a pilot pressure input thereto from downstream of the compressor to regulate the hydrogen in pressure before the hydrogen is supplied to the anode electrode.

According to another aspect of the present invention, there is provided a fuel cell system including: a fuel cell having an anode electrode and a cathode electrode, the fuel cell generating electricity by supplying hydrogen to the anode electrode, and a reaction gas to the cathode electrode; an anode gas supply device which supplies hydrogen to the anode electrode; and a cathode gas supply device which drives a compressor using electric power generated by the fuel cell, and supplies the reaction gas pressurized to the cathode electrode, comprising: a target pressure setting device which sets a target value for cathode pressure of the fuel cell; a correction device (for example, step S30 in the embodiment) which corrects the target value in accordance with intake air temperature; and a control device which controls the cathode pressure of the fuel cell to the corrected target value.

According to the thus constructed fuel cell system, since the target value can be corrected in accordance with the intake air temperature being a cause of variation in the electric power consumption of the compressor, then even when the intake air temperature varies, the electric power consumption of the compressor can be suppressed and a decrease in external output can be prevented.

Preferably, in the fuel cell system as mentioned above, the correction device decreases the target value when a detected intake air temperature increases.

According to the thus constructed fuel cell system, since the target value is decreased when the intake air temperature increases, then a drive power equivalent to when the intake air temperature does not increase is required of the compressor, and an increase in the electric power consumption of the compressor can be prevented, and a decrease in external output can be prevented.

Preferably, the fuel cell system as mentioned above further comprises a back pressure valve located downstream of the cathode electrode, whose opening is feedback-controlled by the control device such that the cathode pressure of the fuel cell matches the corrected target value for the cathode pressure.

Preferably, the fuel cell system as mentioned above further comprises a regulator located between the anode gas supply device and the anode electrode, the regulator being operated in accordance with a pilot pressure input thereto from downstream of the compressor to regulate the hydrogen in pressure before the hydrogen is supplied to the anode electrode.

According to yet another aspect of the present invention, there is provided a fuel cell system including: a fuel cell having an anode electrode and a cathode electrode which generates electricity by supplying hydrogen to the anode electrode, and a reaction gas to the cathode electrode; an anode gas supply device which supplies hydrogen to the anode electrode; and a cathode gas supply device which drives a compressor using electric power generated by the fuel cell, and supplies the reaction gas to the cathode electrode, comprising: a target flow setting device which sets a target value for flow of the reaction gas to the cathode electrode; an actual flow detecting device that detects an actual flow of the reaction gas to the cathode electrode; and a control device which controls the compressor such that the actual flow of the reaction gas matches the target value for flow of the reaction gas to the cathode electrode.

Preferably, the fuel cell system as mentioned above further comprises a back pressure valve located downstream of the cathode electrode, which is feedback-controlled by the control device to control cathode pressure of the fuel cell.

According to still another aspect of the present invention, there is provided a control method for a fuel cell in which: a fuel cell having an anode electrode and a cathode electrode generates electricity by supplying hydrogen to the anode electrode, and a reaction gas to the cathode electrode; hydrogen is supplied to the anode electrode; and a compressor is driven using electric power generated by the fuel cell to supply the reaction gas pressurized to the cathode electrode, comprising the steps of: setting a target value for cathode pressure of the fuel cell; correcting the target value in accordance with atmospheric pressure; and controlling the cathode pressure of the fuel cell to the corrected target value.

Preferably, in the control method as mentioned above, the correcting step decreases the target value when a detected atmospheric pressure decreases.

According to yet another aspect of the present invention, there is provided a control method for a fuel cell in which: a fuel cell having an anode electrode and a cathode electrode generates electricity by supplying hydrogen to the anode electrode, and a reaction gas to the cathode electrode; hydrogen is supplied to the anode electrode; and a compressor is driven using electric power generated by the fuel cell to supply the reaction gas pressurized to the cathode electrode, comprising the steps of: setting a target value for cathode pressure of the fuel cell; correcting the target value in accordance with intake air temperature; and controlling the cathode pressure of the fuel cell to the corrected target value.

Preferably, in the control method as mentioned above, the correcting step decreases the target value when a detected intake air temperature increases.

DETAILED DESCRIPTION OF THE INVENTION

Figure 1:
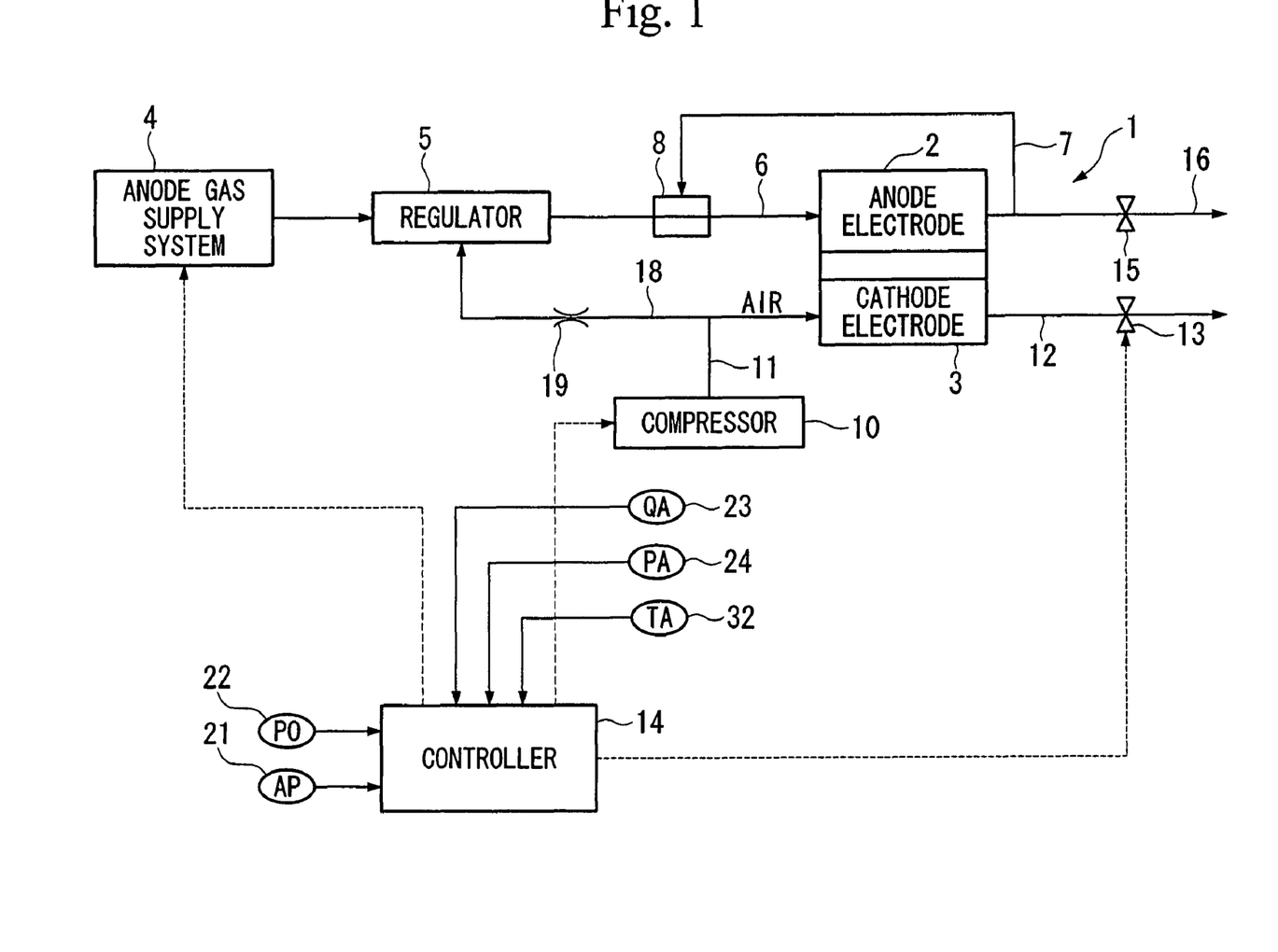
FIG. 1 is a block diagram of a fuel cell system in a first embodiment of the present invention.

Hereunder is a description of a fuel cell system according to the present invention, with reference to the drawings. FIG. 1 is a block diagram of the fuel cell system in a first embodiment of the present invention.

A fuel cell (FC) 1 comprises cells of solid polymer electrolyte membrane formed from a solid polymer ion exchange membrane or the like, sandwiched between an anode electrode 2 and a cathode electrode 3, with a plurality of layers of cells each sandwiched between separators (FIG. 1 is a simplified diagram and therefore only a single cell is shown). When hydrogen gas is supplied to the anode electrode 2 as fuel gas, and air including oxygen is supplied to the cathode electrode 3 as reaction gas, hydrogen ions generated by the catalytic reaction at the anode electrode 2 pass through the solid polymer electrolyte membrane and migrate to the cathode electrode 3, giving rise to an electrochemical reaction with oxygen at the cathode electrode 3, and generating electricity and water.

Air is pressurized to a predetermined pressure by a compressor 10 such as a supercharger (S/C) or the like, then supplied to the cathode electrode 3 of the fuel cell 1 from an air supply flow path 11, and discharged as air off-gas from the fuel cell 1 from an air off-gas flow path 12 via a back pressure valve 13.

On the other hand, the hydrogen gas supplied from an anode gas supply system 4 having a high-pressure hydrogen tank (H2) is decreased in pressure to a predetermined pressure by a regulator 5 provided midway along a hydrogen gas supply flow path (fuel supply flow path) 6, and supplied to the anode electrode 2 of the fuel cell 1. The hydrogen gas supplied to the fuel cell 1 is employed in generation of electricity, and discharged as hydrogen off-gas to a hydrogen off-gas circulation flow path (circulation flow path) 7 from the fuel cell 1.

The hydrogen off-gas circulation flow path 7 is connected to the hydrogen gas supply flow path 6 downstream of the regulator 5 via an ejector 8. Thus, the hydrogen off-gas discharged from the fuel cell 1 is merged with the hydrogen gas supply flow path 6 via the ejector 8, and thus the hydrogen off-gas is mixed with fresh hydrogen gas supplied from the anode gas supply system 4, and supplied again to the anode electrode 2 of the fuel cell 1.

Here, a branch flow path 16 is provided in the hydrogen off-gas circulation flow path 7, and a discharge valve 15 is provided in this branch flow path 16.

Furthermore, a branch flow path 18 branched from the air supply flow path 11 downstream of the compressor 10 is connected to the regulator 5 via an orifice 19, and the regulator 5 is operated in accordance with a pilot pressure input from the branch flow path 18.

Moreover, the anode gas supply system 4, the compressor 10, and the back pressure valve 13 are each connected to a controller (ECU) 14. This controller 14 computes the electric power required for operation of the load, and sends control signals to the anode gas supply system 4 and the compressor 10 based on the computed electric power. Thus, the amount of reaction gases supplied from the anode gas supply system 4 and the compressor 10 is adjusted, and the amount of electricity generated in the fuel cell 1 controlled.

Furthermore, the controller 14 is connected to an accelerator pedal opening sensor 21, an atmospheric pressure sensor 22, an airflow sensor 23 which detects the amount of airflow supplied to the cathode electrode 3 from the compressor 10, an air pressure sensor 24 which detects the air pressure, and an intake air temperature sensor 32, and control is conducted in accordance with the detected values detected by these sensors 21 through 24, and 32. Hereunder is a description of this control.

Figure 2:
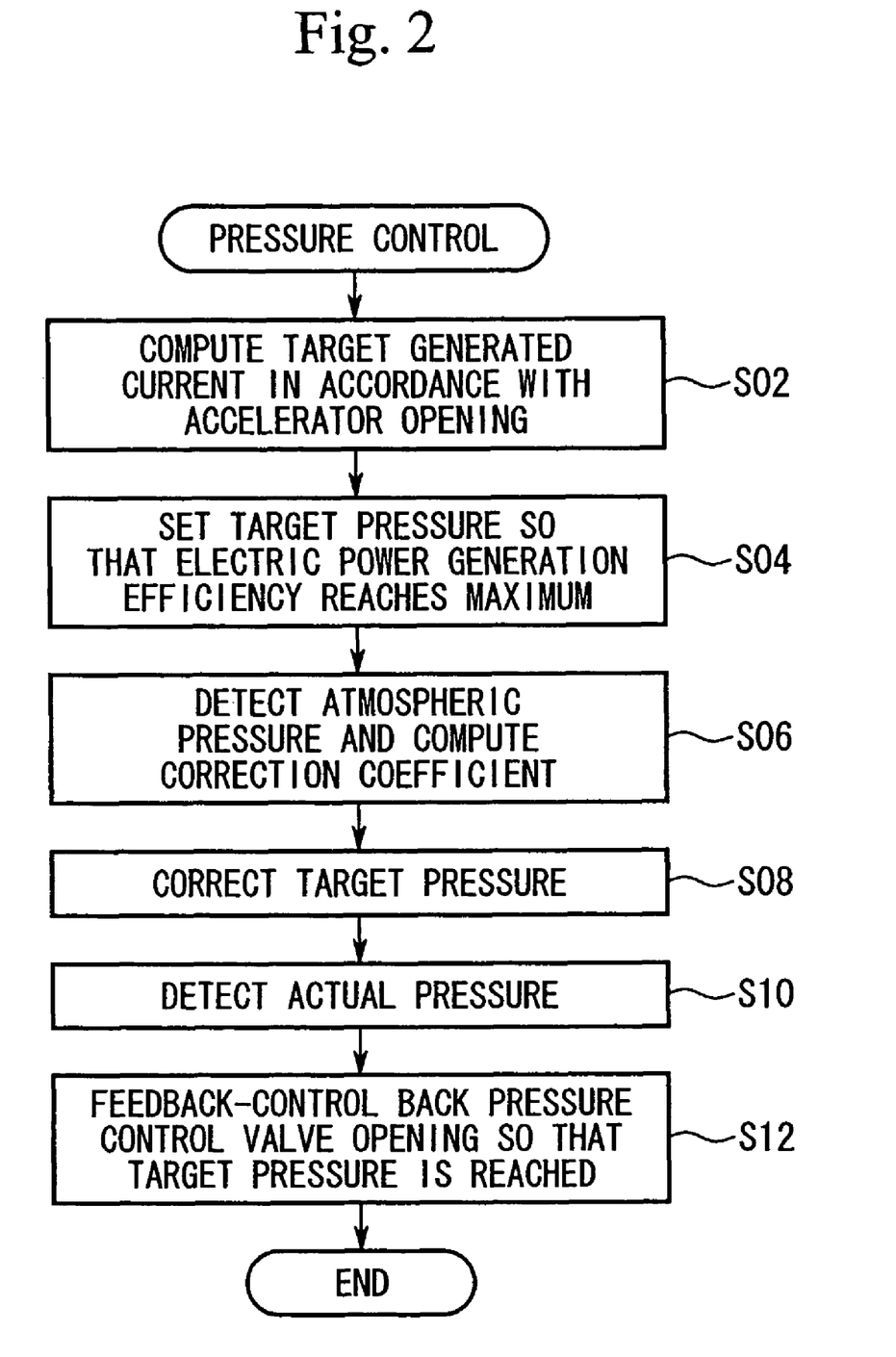
FIG. 2 is a flowchart for pressure control processing in the fuel cell system of FIG. 1.
Figure 6:
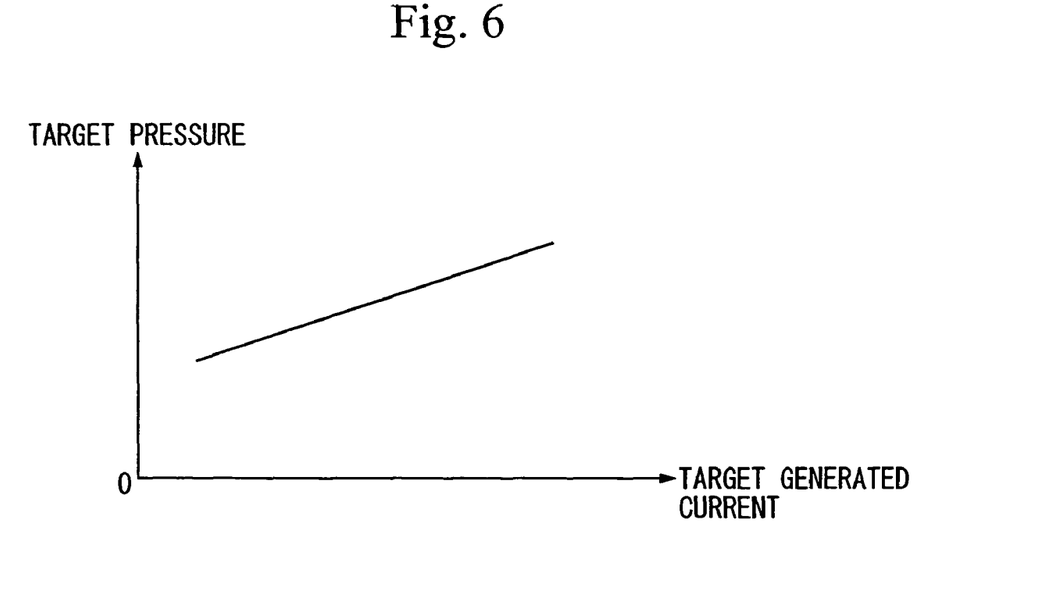
FIG. 6 is a graph showing a relationship between target generated current and target pressure.

FIG. 2 is a flowchart for control of the pressure of the reaction gas supplied to the fuel cell 1, in the fuel cell system. Firstly in step S02, a target generated current for the fuel cell 1 is computed in accordance with the accelerator pedal opening detected by the accelerator pedal opening sensor 21. In step S04, the target pressure is set so that maximum efficiency is reached at the target generated current. This target pressure is set using FIG. 6. FIG. 6 is a graph showing the relationship between target generated current and target pressure in the standard state (state wherein the atmospheric pressure value is the reference pressure value, and intake air temperature value is the reference temperature value). Here, the inlet pressure of the cathode electrode 3 is set as the standard pressure, however, the outlet pressure may also be set.

Figure 7:
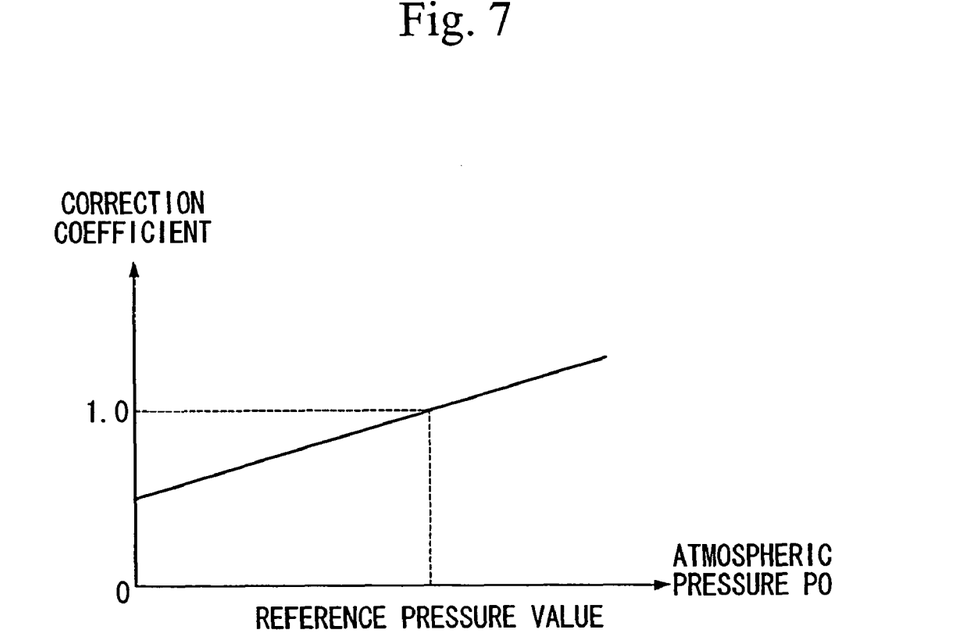
FIG. 7 is a graph showing a relationship between atmospheric pressure and correction coefficient.

In step S06, the atmospheric pressure PO is detected by the atmospheric pressure sensor 22, and a correction coefficient is computed in accordance with this atmospheric pressure PO. This correction coefficient is computed using FIG. 7. FIG. 7 is a graph showing the relationship between atmospheric pressure and the correction coefficient. In the present embodiment, the pressure value at a predetermined height above sea level (for example, 0 m above sea level) is set as the reference pressure value, and the correction coefficient at this reference value is set to 1.0. If the atmospheric pressure detected by the atmospheric pressure sensor 22 is greater than the reference pressure value, the correction coefficient is increased, and if the atmospheric pressure detected by the atmospheric pressure sensor 22 is less than the reference pressure value, the correction coefficient is decreased.

In step S08, the target pressure is corrected in accordance with the correction coefficient. This correction is conducted by multiplying the target pressure value set in step S04 by the correction coefficient.

In step S10, the inlet pressure (actual pressure) of the cathode electrode 3 is detected by the air pressure sensor 24. In step S12, the opening of the back pressure valve 13 is feedback-controlled so that the target pressure corrected in step S08 matches the actual pressure, and the processing for this flowchart is completed.

Figure 3:
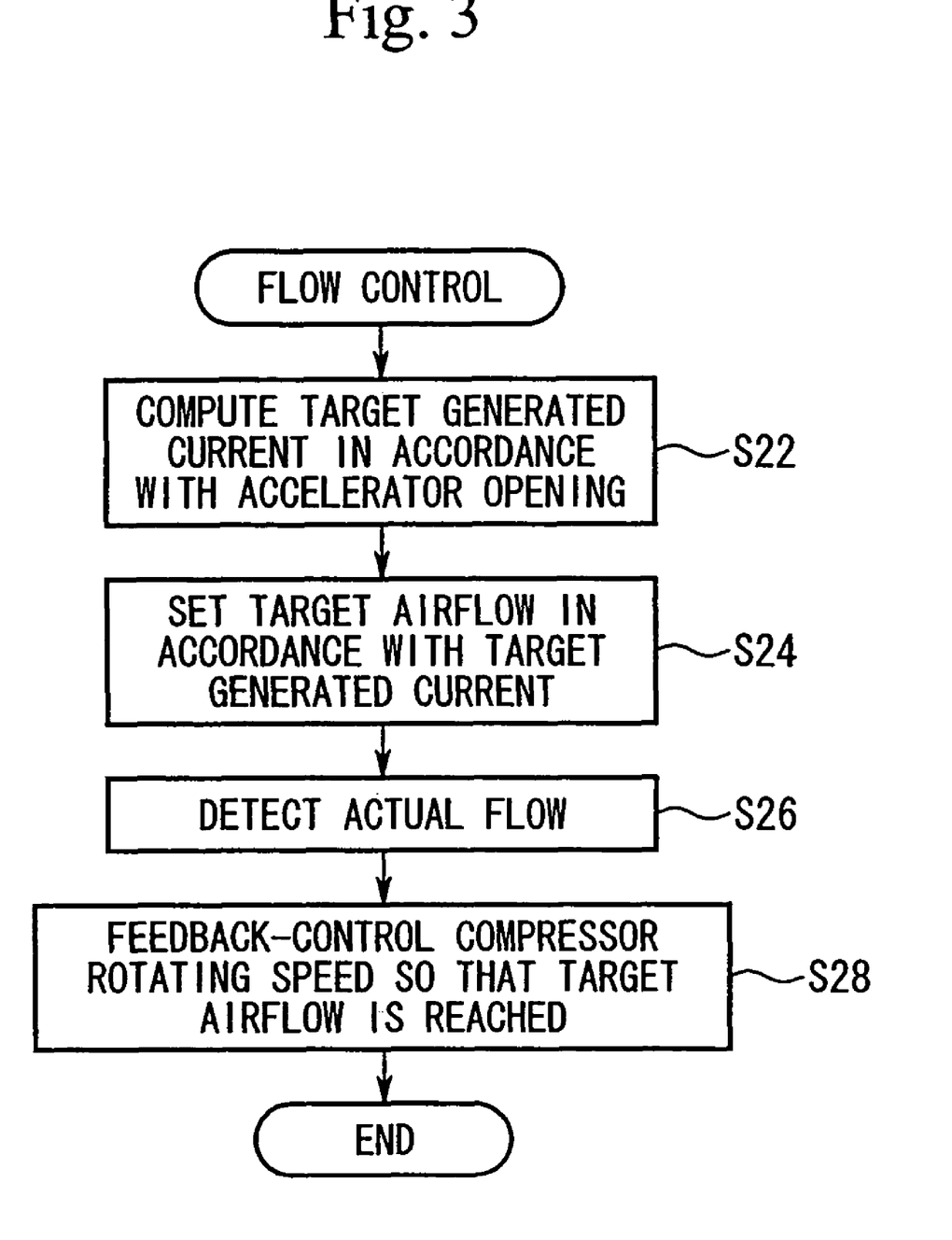
FIG. 3 is a flowchart for flow control processing in the fuel cell system of FIG. 1.

FIG. 3 is a flowchart for control of the flow of reaction gas supplied to the fuel cell 1.

In step S22, the target generated current for the fuel cell 1 is computed in accordance with the accelerator opening detected by the accelerator pedal opening sensor 21. In step S24 the target airflow is set in accordance with the target generated current. Here, the inlet flow of the cathode electrode 3 is set as the target airflow, however the outlet flow may also be set. In step S26, the inlet flow (actual flow) of the cathode electrode 3 is detected by the airflow sensor 23. In step S28, the rotating speed of the compressor 10 is feedback-controlled so that the actual flow matches the target airflow, and the processing for this flowchart is completed.

In this way, controlling the airflow for the cathode electrode 3 by the rotating speed of the compressor 10, and on the other hand independently controlling the air pressure of the cathode electrode 3 by the back pressure valve 13, is desirable from the point of enabling accurate control of the respective amounts. The compressor 10 and the back pressure valve 13 can be used together for control of the airflow and the air pressure.

Figure 5:
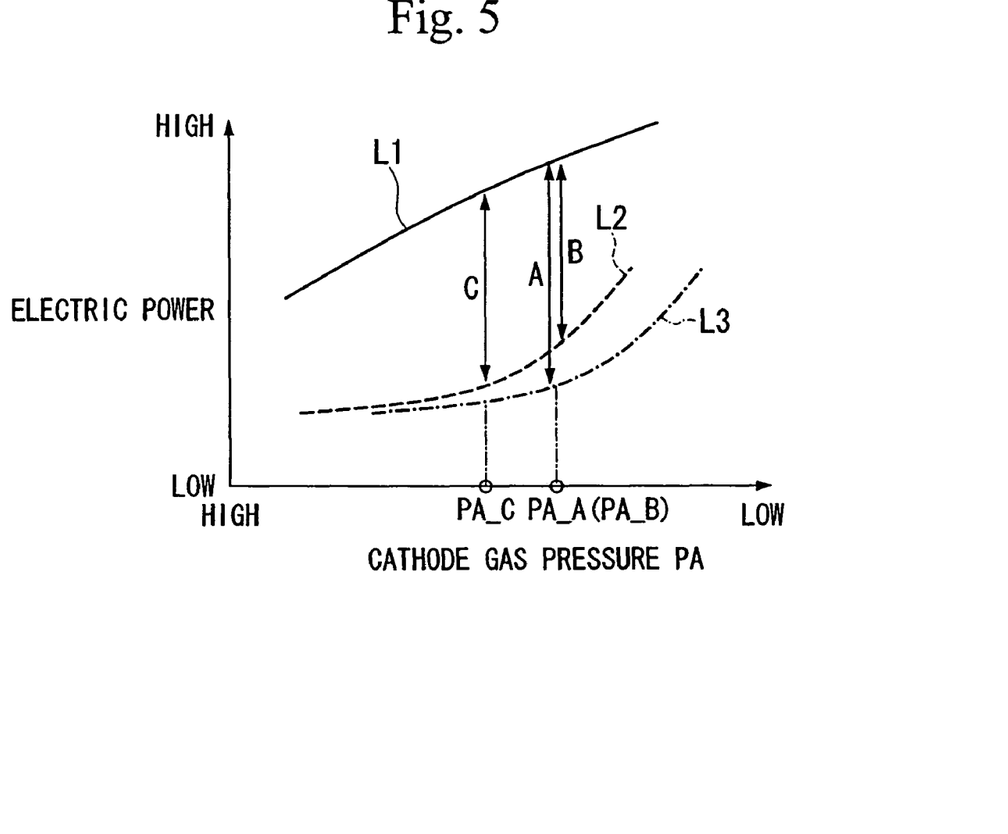
FIG. 5 is a graph showing a relationship between cathode gas pressure, and electric power generated by a fuel cell, and electric power consumption of a compressor.

FIG. 5 is a graph showing the relationship between the cathode gas pressure and electric power generated by the fuel cell 1, and the electric power consumption of the compressor. In this figure, line L1 represents the electric power generated by the fuel cell 1, line L2 represents the electric power consumption of the compressor 10 at the target pressure without the correction shown in steps S06 and S08, and line L3 represents the electric power consumption of the compressor 10 at the corrected target pressure. Moreover, PA_C is a pressure value approximately the same as the reference pressure value, and PA_A (equal to PA_B) is a pressure value a certain amount less than the reference pressure value. As shown in the same figure, when the atmospheric pressure is comparatively close to the reference pressure value (PA_C), the electric power consumption of the compressor 10 is approximately equal irrespective of whether or not correction is used, and the external output becomes approximately equal. However, when the atmospheric pressure is less than the reference pressure value (PA_A, PA_B), unless the target pressure is corrected, the electric power consumption of the compressor 10 increases, and the electric power extracted from the fuel cell 1 minus the compressor 10 consumption decreases significantly. Conversely, when the target pressure is corrected, the increase in electric power consumption of the compressor 10 can be suppressed, and the decrease in external output can be suppressed.

Figure 9:
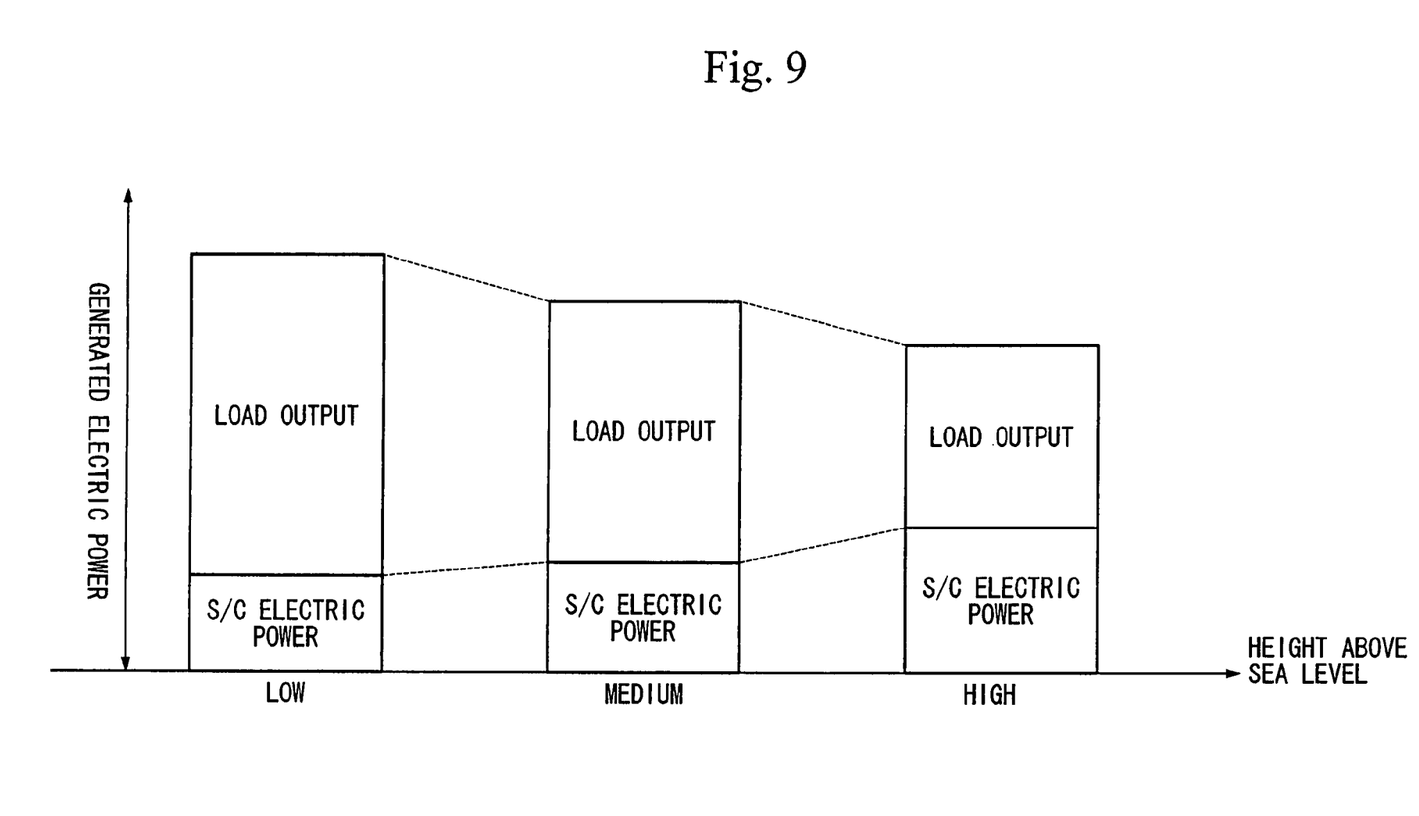
FIG. 9 is a schematic diagram showing a relationship between height above sea level and generated electric power in the fuel cell system of FIG. 1.
Figure 10:
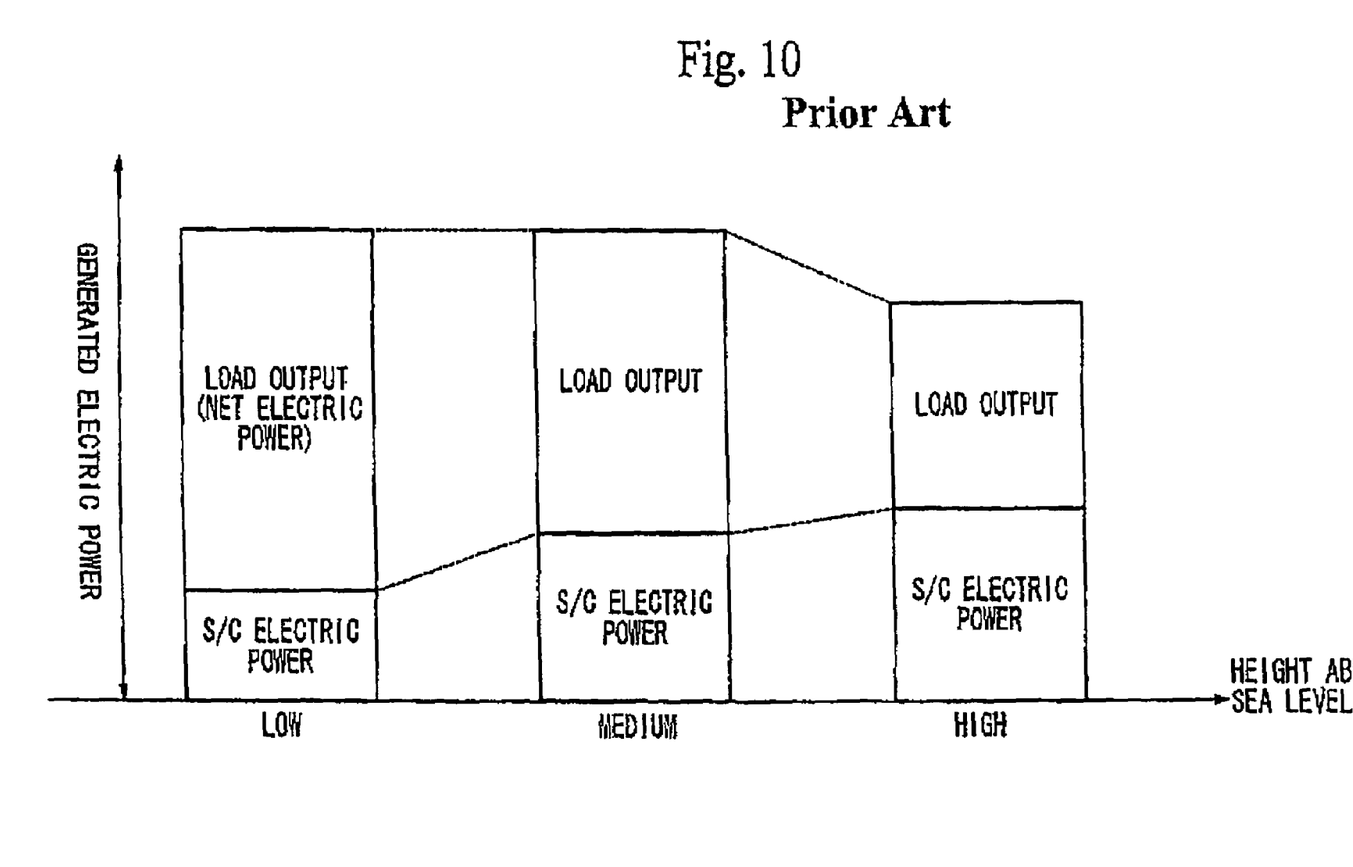
FIG. 10 is a schematic diagram showing a relationship between height above sea level and generated electric power in a conventional fuel cell system.

Furthermore, the difference between effects of the fuel cell system of the present embodiment and the conventional fuel cell system is explained using FIG. 9 and FIG. 10. As shown in FIG. 10, in the conventional fuel cell system, since the electric power consumption of the compressor 10 is low at a low height above sea level (height above sea level: low), an external output (load output) comparatively similar to that required can be obtained. However, even when height above sea level increases to a certain extent (height above sea level: medium), the fuel cell system attempts to maintain the inlet pressure of the cathode electrode 3 at a high state similar to that at a low height above sea level, and the generated electric power output therefore remains approximately unchanged. However, since the amount of compressor 10 work increases due to the decrease in pressure, the electric power consumption of the compressor 10 increases. Therefore the external output decreases significantly as a result. When the height above sea level increases further (height above sea level: high), the performance limit of the compressor 10 is reached and the generated electric power decreases, while on the other hand, the electric power consumption of the compressor 10 increases further, so that the external output decreases further.

Conversely, with the fuel cell system of the present embodiment, since the electric power consumption of the compressor 10 is low at a low height above sea level (height above sea level: low), a high external output can be obtained. Moreover, even when the height above sea level increases to a certain extent (height above sea level: medium), correction is applied to decrease the cathode electrode 3 inlet pressure, and the generated electric power decreases, while the increase in the amount of work of the compressor 10 can be suppressed. Therefore, the overall electricity generation efficiency can be maintained in a high state similar to that wherein the height above sea level is low. Furthermore, when the height above sea level increases further (height above sea level: high), even if the performance limit of the compressor 10 is reached, since correction is performed to further decrease the inlet pressure of the cathode electrode 3, the increase in the amount of work of the compressor 10 can be suppressed, and electricity generation efficiency can be increased beyond the conventional case.

Figure 4:
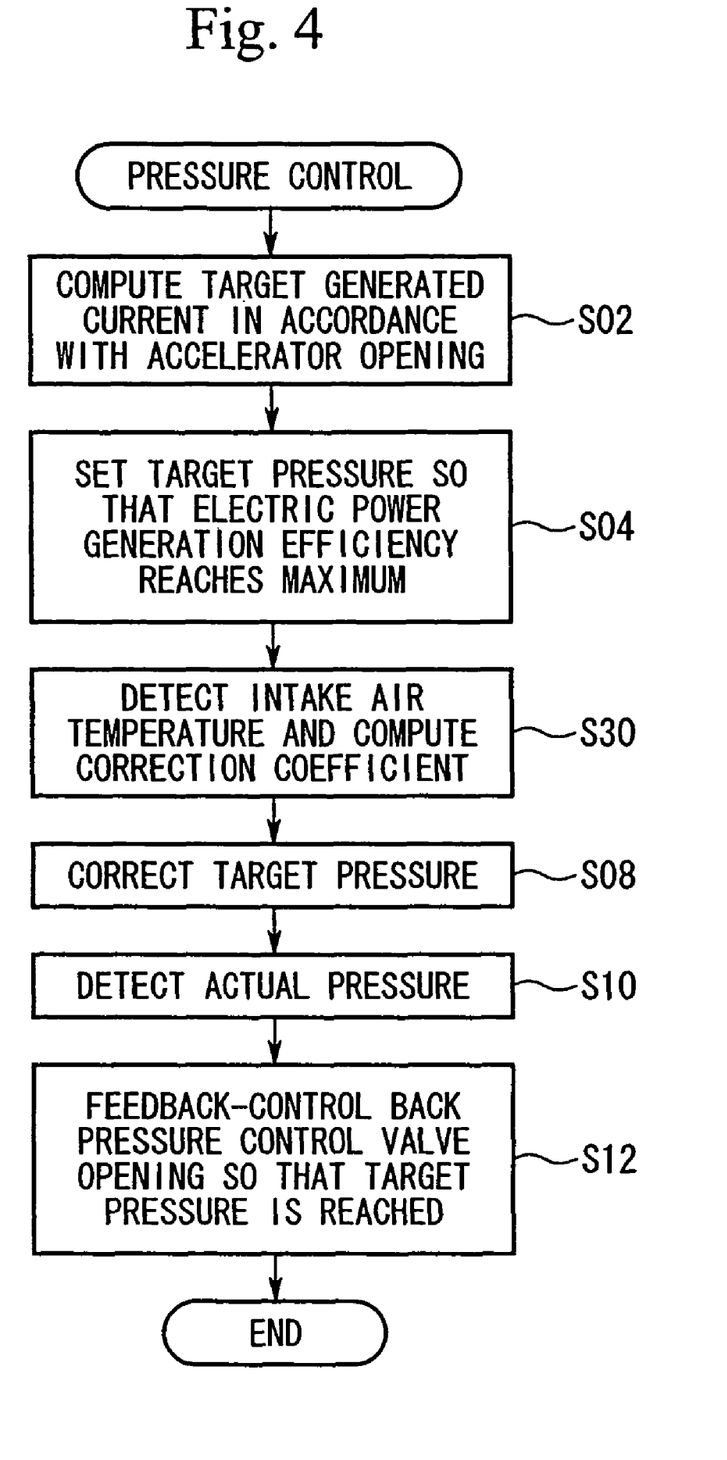
FIG. 4 is a flowchart for pressure control processing in the fuel cell system of FIG. 1, in accordance with another embodiment of the present invention.
Figure 8:
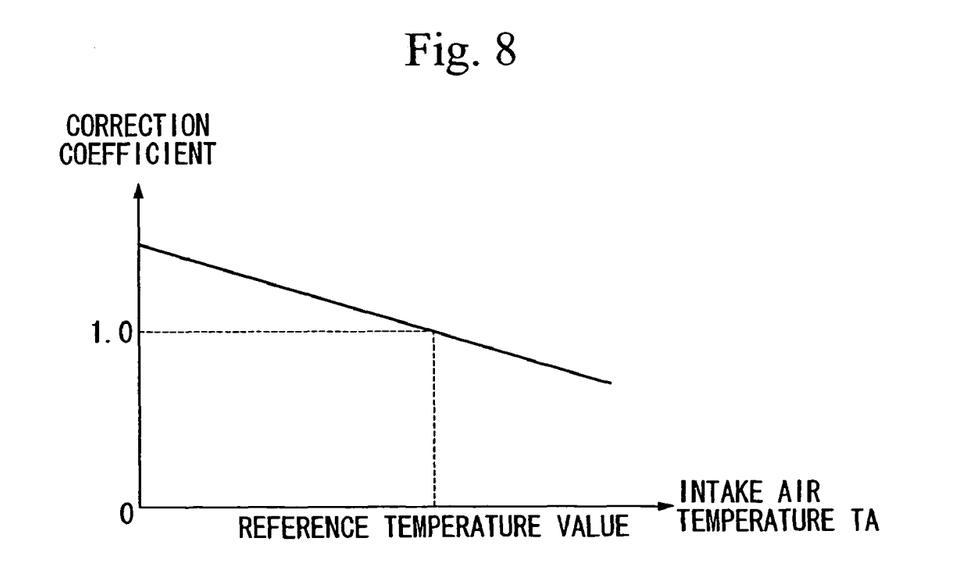
FIG. 8 is a graph showing a relationship between intake air temperature and correction coefficient.

Next, the fuel cell system in a second embodiment of the present invention is described using FIG. 1. The present embodiment differs from the first embodiment in the use of an intake air temperature sensor 32 in place of the atmospheric pressure sensor 22, and control is in accordance with the intake air temperature TA. This is described using FIG. 4. FIG. 4 is a flowchart for pressure control processing in the fuel cell system of FIG. 1. As shown in this figure, in this flowchart, in place of the processing in step S06 in FIG. 2, the intake air temperature TA is detected by the intake air temperature sensor 32 and the correction coefficient is computed in accordance with the intake air temperature TA. This correction coefficient is computed using FIG. 8. FIG. 8 is a graph showing the relationship between intake air temperature and correction coefficient. In the present embodiment, the intake air temperature value at a predetermined height above sea level (for example, 0 m above sea level) is set as the reference temperature value, and the correction coefficient at this reference temperature value is set to 1.0. Then when the intake air temperature detected by the intake air temperature sensor 32 is greater than the reference temperature value, the correction coefficient is decreased, and when the intake air temperature detected by the intake air temperature sensor 32 is less than the reference temperature value, the correction coefficient is increased. Since the volume of air in the compressor 10 also increases when the intake air temperature is greater than the reference temperature value, then when the fuel cell system attempts to maintain the pressure of the cathode electrode 3 to that for when the intake pressure is the same as the reference value, the electric power consumption of the compressor 10 increases. Therefore, by correcting as in step S08 in FIG. 4, the increase in electric power consumption of the compressor 10 can be suppressed.

In this manner, in the present embodiment, even if the intake air temperature varies, the electric power consumption of the compressor 10 can be suppressed, and a decrease in the external output can be prevented, and electric power can therefore be generated efficiently even if the ambient temperature environment varies.

According to the present invention, even when the atmospheric pressure varies, the electric power consumption of the compressor can be suppressed, and a decrease in external output can be prevented. Therefore efficient electric power generation can be performed even if the ambient pressure environment varies.

According to the present invention, efficient electric power generation can be performed even if the atmospheric pressure decreases.

According to the present invention, even when the intake air temperature varies, the electric power consumption of the compressor can be suppressed, and a decrease in external output can be prevented. Therefore efficient electric power generation can be performed even if the ambient temperature environment varies.

According to the present invention, efficient electric power generation can be performed even if the intake air temperature increases.

The details of the present invention are naturally not limited to the embodiments. For example, in the embodiments, a fuel cell system as mounted in a vehicle has been explained, however, this is not limited to a vehicle. Moreover, in the embodiments, the reference pressure value and the reference temperature value are set, and if the detected atmospheric pressure is less than the reference pressure value, or the detected intake air temperature is greater than the reference temperature value, the cathode pressure target value is controlled to decrease. However, the reference pressure value and the reference temperature value need not be set. That is to say, when the detected atmospheric pressure target value tends to decrease, or when the detected intake air temperature tends to increase, the cathode pressure target value may be controlled to decrease. Furthermore, the control in the first embodiment and the control in the second embodiment may be used together.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell system, comprising:
an accelerator pedal opening sensor;
an atmospheric pressure sensor which detects an atmospheric pressure;
a fuel cell having an anode electrode and a cathode electrode which generates electricity by supplying hydrogen to said anode electrode and a reaction gas to said cathode electrode;
a back pressure valve located downstream of said cathode electrode;
an anode gas supply device which supplies hydrogen to said anode electrode;
a regulator located between said anode gas supply device and said anode electrode;
a cathode gas supply device which includes a compressor using electric power generated by said fuel cell and supplies the reaction gas pressurized to said cathode electrode;
an intake air temperature sensor which detects temperature of intake air to said compressor;
a fluid communication circulation path for at least some hydrogen output gas from said anode electrode to combine between the regulator and the anode electrode with the hydrogen from the anode gas supply device being input to the anode electrode;
a control device connecting to said accelerator pedal opening sensor, said atmospheric pressure sensor and said back pressure valve, said control device including a target pressure setting device and a correction device, said target pressure setting device setting a target value for cathode pressure of the pressurized reaction gas input to said cathode electrode, said control device computing a target generated current in accordance with an accelerator pedal opening detected by said accelerator pedal opening sensor, said target pressure setting device using a relationship between said target generated current and said target value for cathode pressure to set said target value so that maximum efficiency is reached at said target generated current, said correction device correcting said target value to a corrected target value in accordance with both of:
  said detected atmospheric pressure in accordance with a correction coefficient obtained using a relationship between the detected atmospheric pressure and the correction coefficient; and
  said compressor intake air temperature in accordance with a correction coefficient obtained using a relationship between the intake air temperature and the correction coefficient, said relationship being defined so that when the temperature of intake air increases, said target value is decreased and an increase in an electric power consumption of the compressor is suppressed, said control device controlling the cathode pressure of said fuel cell to the corrected target value; and said regulator being operated in accordance with a pilot pressure input thereto from said reaction gas at the cathode pressure downstream of said compressor to regulate pressure of said hydrogen as an anode pressure before said hydrogen is supplied to said anode electrode, wherein both the cathode pressure and the anode pressure are corrected and controlled and wherein the hydrogen fed to the anode electrode at the anode pressure includes at least some hydrogen output gas via the circulation path.

2. A control method for a fuel cell in which the fuel cell has an anode electrode, a cathode electrode, a back pressure valve located downstream of said cathode electrode, and a compressor; said fuel cell generating electricity by supplying hydrogen with an anode pressure to said anode electrode and by supplying a reaction gas with a cathode pressure to said cathode electrode, said fuel cell with the compressor driven using electric power generated by said fuel cell, said compressor supplying the reaction gas pressurized to said cathode electrode, said method comprising:

computing a target generated current for said fuel cell in accordance with an accelerator pedal opening;

setting a target value for cathode pressure of said fuel cell so that maximum efficiency is reached at said target generated current using a relationship between said target generated current and said target value for the cathode pressure;

computing a correction coefficient in accordance with both of:
  a detected atmospheric pressure using a relationship between said detected atmospheric pressure and said correction coefficient; and
  a compressor intake air temperature in accordance with a correction coefficient obtained using a relationship between the intake air temperature and the correction coefficient, so that when the compressor intake air temperature increases, decreasing said target value to suppress an increase in an electric power consumption of the compressor;

correcting said target value to a corrected target value in accordance with said correction coefficient; and controlling the compressor and the back pressure valve such that the cathode pressure of said fuel cell matches the corrected target value for the cathode pressure and such that the anode pressure of the hydrogen is also regulated based on a pilot pressure taken from a stream of the reaction gas at the cathode pressure downstream from the compressor, said pilot pressure applied to the regulator wherein hydrogen at the anode pressure includes at least some hydrogen output gas from said anode electrode via a fluid communication circulation path from downstream of said anode electrode to combine between the regulator and the anode electrode with hydrogen from an anode gas supply device.

* * * * *